United States Patent Office 2,974,469
Patented Mar. 14, 1961

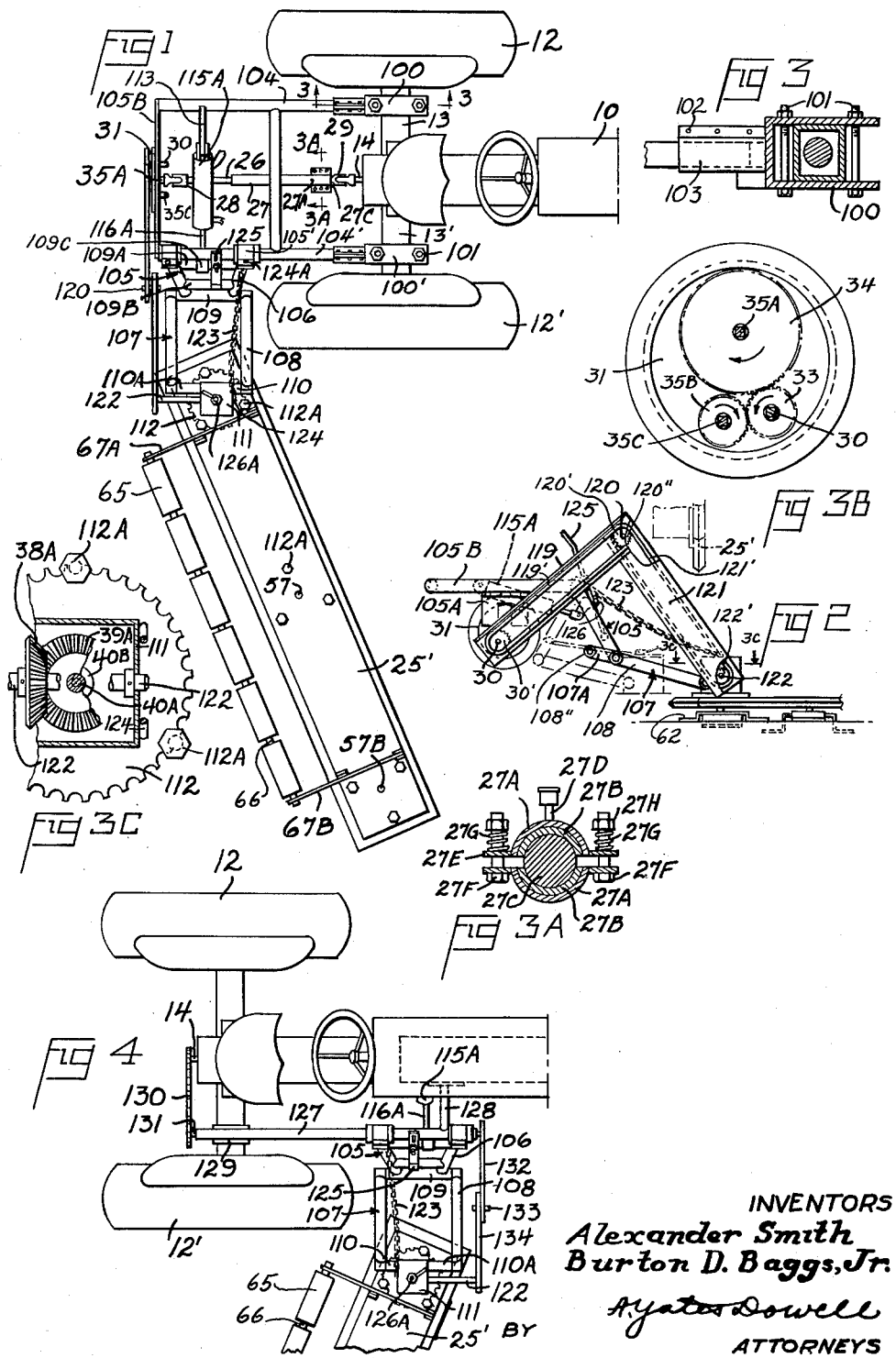

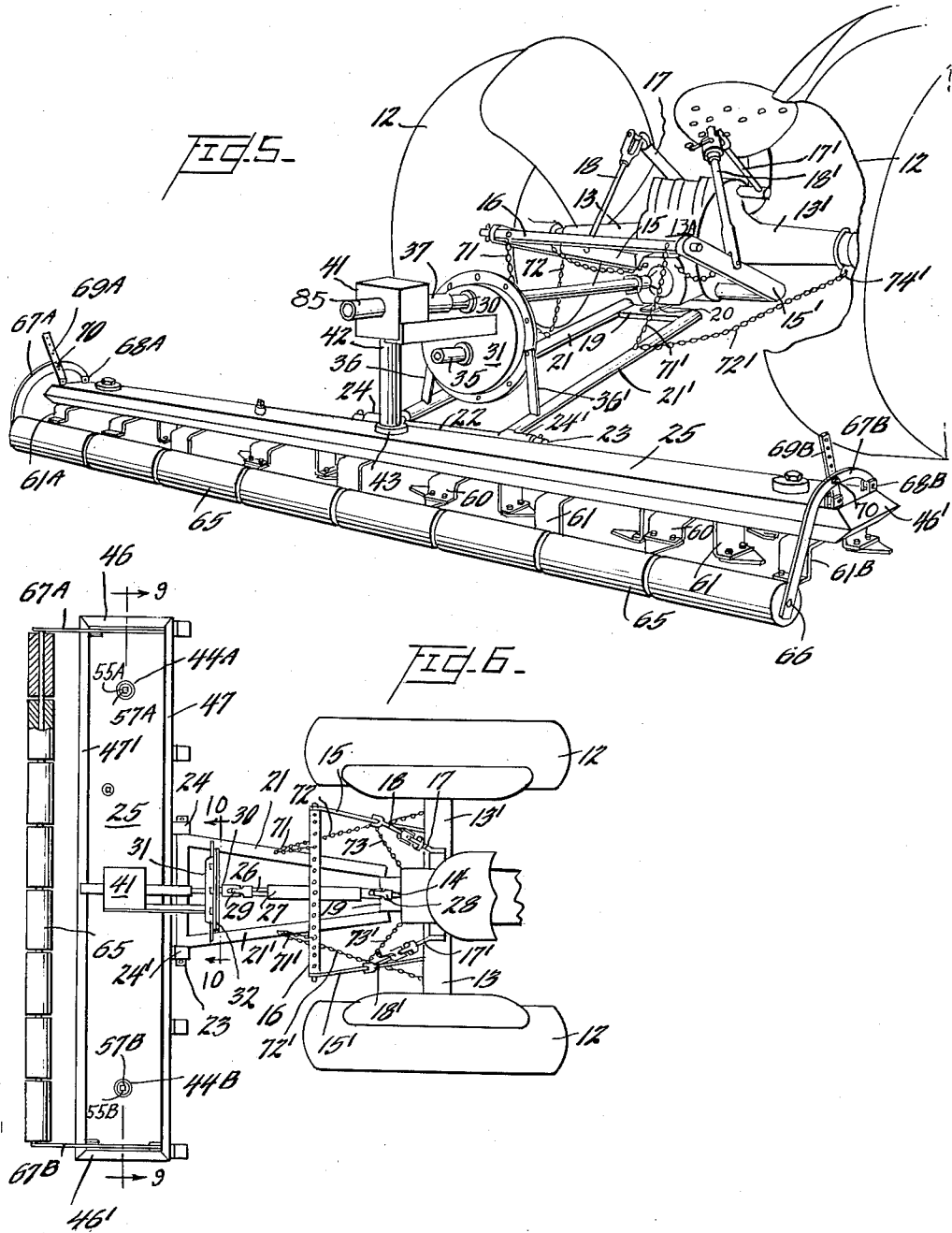

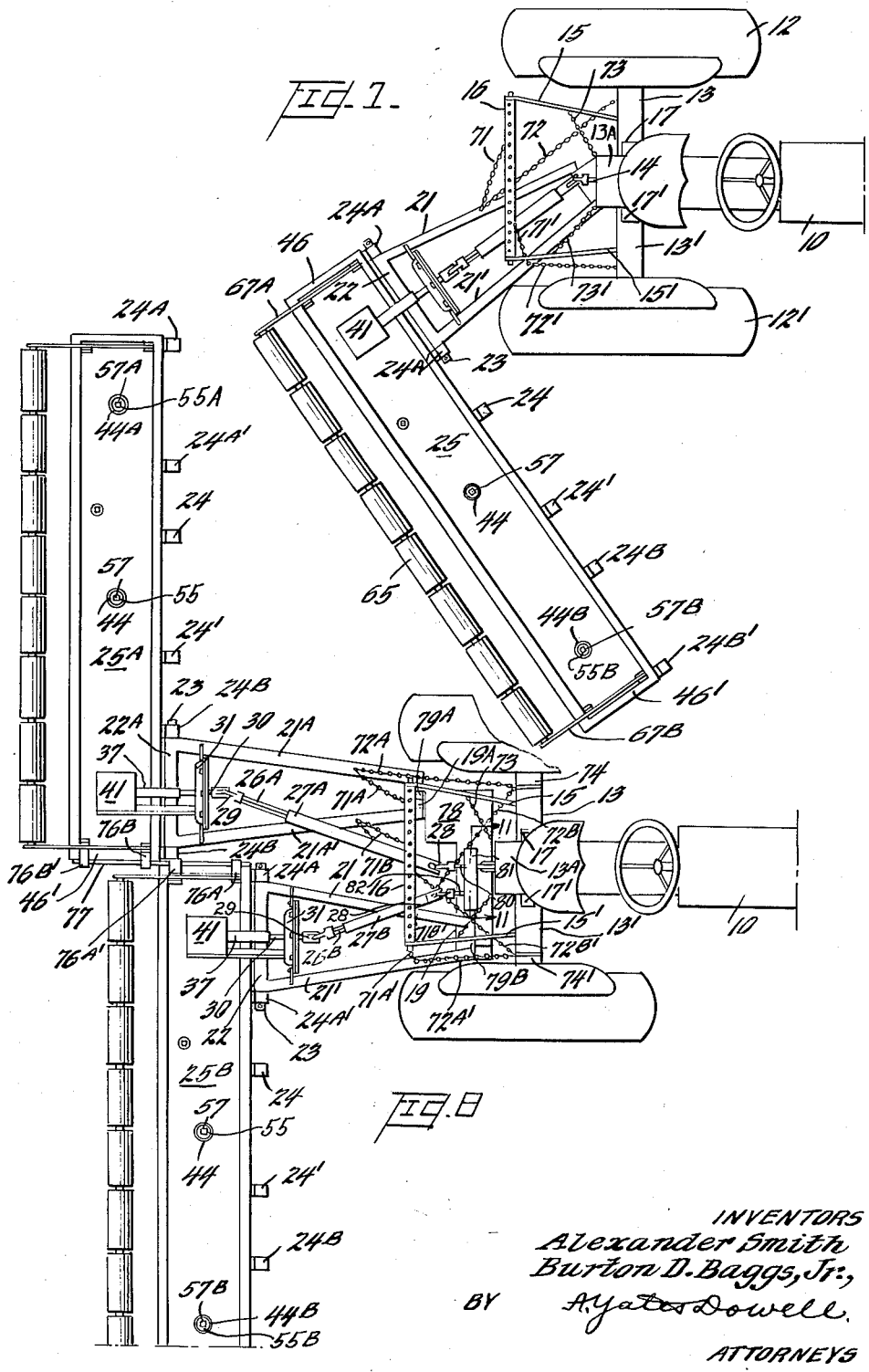

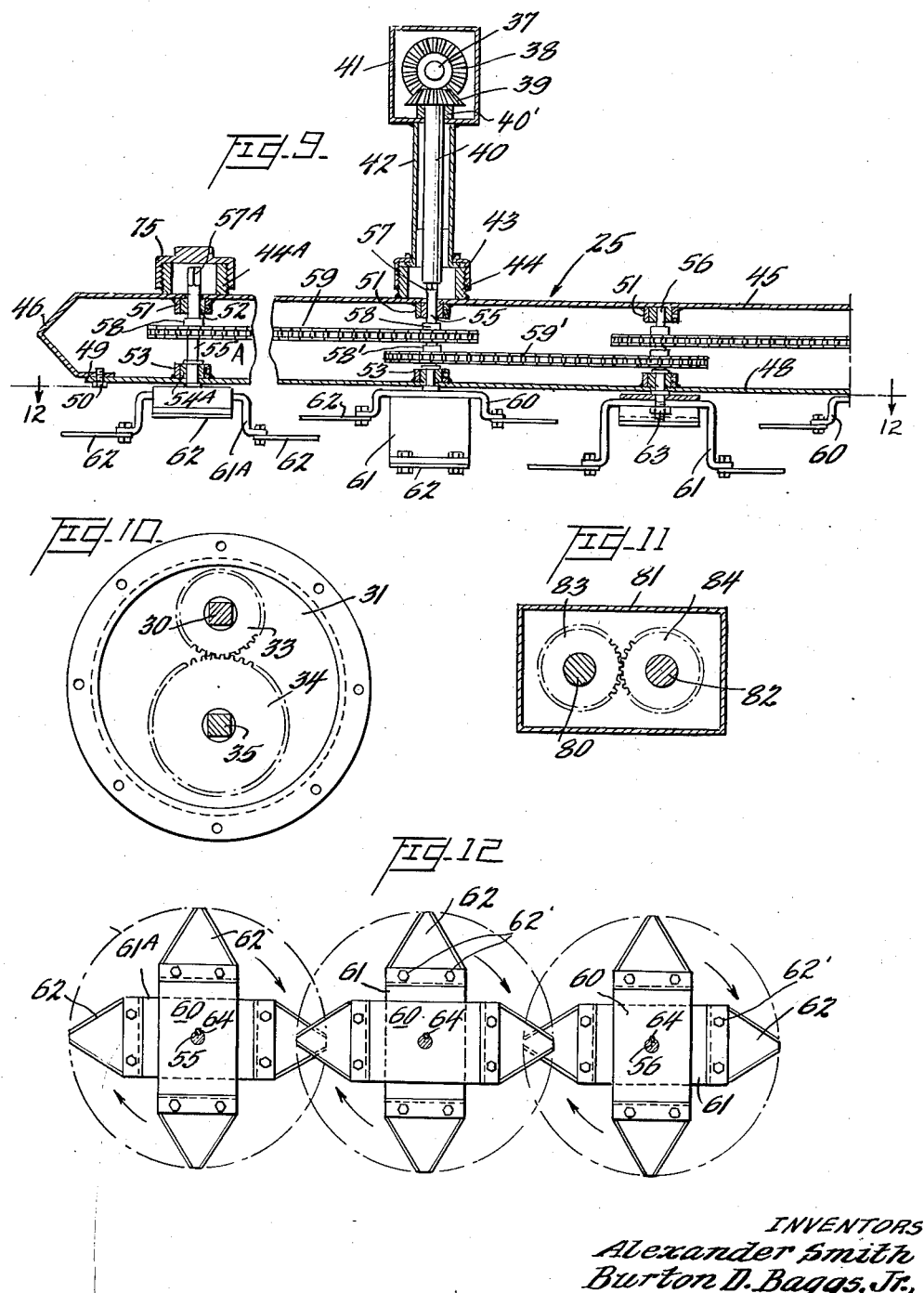

2,974,469

MOWER WITH EXTENSIBLE MOUNTING FRAME AND POWER TRANSMITTING MEANS

Alexander Smith, P.O. Box 1460, and Burton D. Baggs, Jr., 2429 Laurel Ave., both of Sanford, Fla.

Filed Jan. 14, 1957, Ser. No. 633,871

11 Claims. (Cl. 56—25.4)

The invention relates to equipment for use in mowing and hoeing and more particularly to mechanism for attachment to a tractor by means of which harvesting or cutting of growth such as relatively light grass, relatively heavy almost impenetrable grass, weeds, bushes and the like can be accomplished and by means of which the soil may also be treated simultaneously or independently.

Under-tree mowers or hoes have been produced and utilized in citrus groves for cultivation under the trees and for clearing adjacent areas where the growth was thick, some of such devices being more satisfactory than others. However, previous devices of this character require substantial power in their operation and have lacked certain characteristics of design, such as flexibility.

It is an object of the invention to provide a combination mower and hoe capable of being operated with less power, for accomplishing a greater amount of work, as well as to provide a device of this character which could be produced in a shorter time with less material, at less cost, and capable of being attached to or detached from a tractor more quickly, and which device includes an elbow drive and is of greater strength and durability.

Other and further objects will be apparent as the description proceeds and upon reference to the accompanying drawings wherein:

Figure 1 is a plan view of the mower and hoer attached to a tractor at the rear with the outer end of the cutter bar in line with the axis of the rear wheel and showing the control for projecting and withdrawing the cutter bar;

Figure 2, a rear elevation of the mower and hoer unit;

Figure 3, a detailed enlarged section taken on line 3—3 of Fig. 1;

Fig. 3A, an enlarged section taken on line 3A—3A of Fig. 1 showing a safety clutch;

Fig. 3B, an enlarged elevation of a speed change and reversing gear box with the front cover omitted;

Fig. 3C, an enlarged fragmenatry horizontal section on the line 3C—3C of Fig. 2 of the preferred form of gear box and cutter bar attaching means;

Figure 4, a modified form in which the cutter bar is mounted in front of the rear wheels of a tractor;

Figure 5, a perspective with parts broken away showing the cutter bar mounted in trailing arrangement to a towing tractor;

Figure 6, a top plan view with parts broken away and parts shown in section of the towed cutter bar unit of Fig. 5;

Figure 7, a modification of the cutter bar with its outer end extending to the axis of the rear wheels.

Figure 8, a modification of the towed cutter in which two cutter bars are arranged in end to end relation;

Figure 9, an enlarged longitudinal fragmentary section through the cutter bar taken substantially on line 9—9 of Fig. 6;

Figure 10, an enlarged view of a speed reduction gear box with the front cover omitted taken substantially on line 10—10 of Fig. 6;

Fig. 11, an enlarged section taken through another gear box taken substantially on line 11—11 of Fig. 8; and Figure 12, a fragmentary horizontal section taken substantially on line 12—12 of Fig. 9.

Referring more particularly to Figs. 1, 2 and 3 of the drawings, a tractor 10 having rear wheels 12, 12', axle housing sections 13, 13' and a conventional power take-off shaft 14. A driving shaft includes an inner telescoping shaft section 26 slidably keyed within an outer tubular shaft section 27. The tubular section 27 is connected through universal joint 29 to the power take-off shaft 14 of the tractor. The inner section 26 is connected to universal joint 28 which is connected to a shaft 35A in a gear housing. The forward end of the tubular shaft section 27 is split into two halves 27A in which bronze bearing segments 27B are received and such bearing sections frictionally engage a shaft portion 27C which is of steel while the bearing segments are made of bronze or the like being lubricated by a grease fitting 27D. Extending outwardly from the edges of the shaft section 27A are flanges 27E through which bolts 27F pass; suitable springs 27G of a selected tension are retained in adjusted position by nuts 27H whereby a selected frictional contact is made between the bearing segments 27B and the steel shaft 27C to provide for limiting the torque and also to take care of variations in the speed of revolution as a result of driving through universal joints, a universal joint 29 being mounted on the power take-off shaft 14 and having a driven shaft portion 27C which is gripped by the bearing segments 27B; a shaft 35A projects forwardly from a gear housing 31 from which shaft 30 also projects rearwardly for driving mechanism for operating the cutters as hereinafter described.

Within the gear housing the shaft 30 fixedly carries gear 33 while the shaft 35A fixedly carries a gear 34 which gears mesh together producing relative rotation in opposite directions as shown while a third gear 35B meshing with gear 33 is mounted on a shaft 35C which extends forwardly and rearwardly of the gear housing 31 and the forward end of shaft 35C is adapted to be connected to the universal joint 28. Reverse rotation of shaft 35C is obtained when the universal joint 28 is connected to shaft 30. It will be understood when the universal joint 28 is connected to shaft 35A instead of being connected to shaft 30 or shaft 35C, the speed of rotation of the shaft of the cutters is increased. Thus the speeds can be changed and the direction of rotation can be changed by the selection of the shaft to which universal joint 28 is connected.

Mounted on the axle housing sections 13, 13' are mounting brackets 100, 100' each formed of a U-shaped strap having one leg thereof extending over the axle housing and a leg extending under the axle housing. Bolts 101 pass through the U-shaped strap and retain the mounting bracket in fixed position. The rearward end of each bracket has a split tubular socket 103 adapted to receive the forwardly projecting portion of the corresponding leg 104 or 104' of an H frame which is mounted in a horizontal position and retained in position by bolts 102 passing through flanges on each socket. The H frame supports the gear casing 31 by a suitable hinge 105A having one leaf of the hinge fixed to the rear cross brace 105B and having the other leaf of the hinge fixed to the gear case 31. Hingedly mounted on the rear portion of leg 104' of the H frame is a ladder like frame 105 having rails 106 which are pivotally mounted at their upper ends to rail 104' by means of pillow bearing blocks 105'. The lower tubular rung 109 of the ladder frame is hingedly connected to a rectangular frame 107 which has side members 108 which form connecting links, and has one connecting shaft not shown rotatably mounted in the lower tubular rung 109 of the ladder frame. The rectangular frame has U-shaped extension 107A (Fig. 2) which includes extensions of side members 108 and a cross member 108" extending therebetween. Projecting lugs 110 and 110A extend outwardly from and are secured to the gear box 111, said lugs, box and flange forming an integral attaching and driving means and being secured in position on the cutter bar 25' by means of cap screws 112A received in three or more of the spaces between the teeth of the sprocket flange 112 and secured into tapped apertures in the cutter bar, the apertures being radially disposed to the shafts 55 (Fig. 11) of the cutter bar 25' for angular adjustment. This attaching arrangement provides for changing the angular position of cutter bar 25' with respect to the gear box 111 and the tractor 10. The lower ends of side members 107 and 108 of the rectangular frame are pivoted to lugs 110, 110A. It will be evident that the horizontally disposed frame 104, 104', the ladder like frame 105 with its rails 106 and the rectangular frame 107 with its side members 108 provide frame structure including a cutter bar 25' movable toward and away from the earth and also movable laterally toward and away from the tractor.

A strut 113 extending from the leg 104 of the H frame toward leg 104' pivotally supports a hydraulic cylinder 115A having a piston rod 116A which is pivotally connected to a lug 109C fixed on top rung 109A of the ladder frame 105 whereby operation of the hydraulic cylinder produces projection and retraction of the cutter bar 25', the hydraulic cylinder 115A being supplied with hydraulic fluid from a source on the tractor through suitable control means maintaining the position of the cutter bar as desired.

To provide for driving the cutters of the cutter bar, a first chain carrying frame or guard 119 is pivotally mounted on the shaft 30 at one end and is pivotally mounted on a shaft 120 which is common to the chain carrying frame 119 and to a second chain carrying frame 121 for carrying power, the other end of the chain frame 121 being pivotally connected to a shaft 122 of the gear box 111 which is operatively connected to the cutters. A sprocket 30' is fixed on shaft 30 which drives a chain 119' which drives a first sprocket 120' on shaft 120, while a second sprocket 120" on shaft 120 drives a chain 121' which drives a sprocket 122' fixed to the shaft 122. The chain carrying frames 119 and 121 connected by the pivot 120 and associated parts provide in effect an elbow drive which permits the movement of the cutter bar or operating member toward and from the driving connection to a source of power.

The shaft 122 corresponds to a shaft 37 located in the gear housing 41 (Fig. 11) and carries a bevel gear 38A meshing with a bevel gear 39A on a shaft 40A rotatably mounted in a bearing 40B fixed to flange 112, said shaft 40A having a socket in its lower end which receives the square end 57A of a cutter shaft 55A which in turn drives the other cutter shafts and blades by means of chains and the like as shown in Fig. 11. It will be apparent that shaft 40A may be an integral extension of shaft 55A (Fig. 11) in the event the driving is always done from the same end of the cutter bar.

It will be evident that the cutter bar 25' can be moved inwardly and outwardly and the driving relation can be maintained by the jack-knifing of the chain frames 119 and 121 for accommodating the variation in spacing between shaft 30 and shaft 122 as the cutter bar 25 moves outwardly and inwardly. For limiting the projection of the cutter bar 25' a chain 123 is fixedly secured at one end to an inverted V-shaped bracket 124 on the gear box 111, and is adjusted as to length by passing a selected link through a bolt 124A at the top of the ladder frame.

It will also be apparent that by suitable adjustment of the chain the cutter bar 25' can be maintained in a horizontal operative position at a selected height since the positive control obtained by hydraulic cylinder 115A and the adjustment of the chain 123 will provide for a number of intermediate adjustments.

Additionally, to accommodate for variations in depth or height of cut in relation to the ground a plurality of rollers 65 are mounted on a shaft 66 supported at its ends by J-shaped levers 67A and 67B hereinafter described, which in this modification are mounted inwardly of the ends of the cutter bar to avoid interference.

A strut 125 is pivotally mounted at one of its ends to the intermediate rung 109B being provided with a bolt receiving aperture intermediate its ends and at its free end. A bolt 126 on the top rung of the ladder may pass through the intermediate aperture of the strut 125 to secure the strut in the inoperative position shown in full lines by the application of a nut on the bolt 126. When it is desired to raise the cutter bar from its operative position to a raised vertical position for travel from one field to another the strut 125 is released from bolt 126 with the cutter withdrawn to the dotted line position shown in Fig. 2 and the aperture at the free end receives a stud or bolt 126A fixed to and extending upwardly from the gear box 111 whereby a rigid triangular structure is formed between the ladder frame, the rectangular frame and the strut 125 and thereafter upon projection of the piston rod 116A the cutter bar 125' is raised from the position on the ground to the substantially vertical dotted line position shown in Fig. 2.

Upon reference to Fig. 4, an L-shaped horizontally disposed frame, includes a tubular longitudinal arm 127 secured at its rear end to the axle housing section 13' by a clamp 129, the other arm 128 being secured to the tractor frame or motor. A driving chain 130 extends from a sprocket on the power take-off shaft 14 to a sprocket on a shaft 131 extending through the tubular arm 127, the forward end of the shaft 131 pivotally supporting a chain frame 132 which is pivotally connected by a shaft 133 to a second chain frame 134, which in turn is connected to the shaft 122 projecting forwardly from the gear box 111 which is positioned directly above the cutter shaft 55A for driving the same. The chain frames 132 and 134 are preferably closed housings carrying sprockets on shafts 131, 133 and 122 which are drivingly connected by roller chains. The cutter bar 25' is supported from the tubular arm 127 by the ladder-like frame having side rails 106, similar to that previously described, which ladder frame is pivotally connected by its lower rail 109 to one end of the rectangular frame having side members 107, 108, the other end of the rectangular frame being pivotally connected to the projecting lugs 110, 110A secured to the gear box 111. In this modification it will be noted that the cutter bar is supported in front of the wheel 12' and has its outer end extending rearwardly to an extension of the axis of the rear wheels. It will be evident that the hydraulic cylinder 115A is pivotally mounted on the tractor frame and the piston rod 116A serves to project and withdraw the cutter bar 25'.

Upon reference to Figs. 5 and 6 of the drawing, a tractor 10 having front steering wheels and rear traction wheels 12 is of generally conventional construction having rear axle housing sections 13, 13' with a power take-off shaft 14 projecting rearwardly from the central enlargement 13A of the axle housing in a well-known manner with conventional controls being provided. A pair of lever arms 15, 15' are pivotally mounted at their forward ends by any suitable means beneath the central section 13A of the axle housing in suitable pivots or the like, an apertured transverse bar 16 being pivotally mounted on the rear ends of said lever arms 15, 15' the apertures through bar 16 providing for adjustable attachment of lifting chains or agricultural implements or the like.

The lever arms 15, 15' are raised vertically by means of the conventional hydraulic lifting mechanism of tractors, including lifting levers 17, 17' which have their free ends connected by links 18, 18' to the lever arms 15, 15' respectively, the link 18' being normally adjustable as to length in a conventional manner so as to vary the relative positions of the lever arms 15, 15'.

A towing frame, including a plate 19, is pivotally and rockably mounted on the axle housing enlargement 13A by means of a bolt (not shown) passing through apertures (not shown) in the upper and lower arms of a yoke 20 which embraces the plate 19 and through an aperture in the plate 19. The forward ends of a pair of members 21, 21' are secured to the plate 19 by welding or the like and have their rear ends secured together by a sleeve 22, which sleeve receives a shaft 23 passing through the sleeve and projecting outwardly in both directions therefrom and passing through lugs 24, 24' fixed to a cutter bar 25 whereby the towing frame is secured to the cutter bar and to the tractor to provide for towing of the cutter bar during the mowing and hoeing operations.

For driving the cutters of the cutter bar, a splined coupling in the form of a square shaft section 26 is telescopically mounted and slideable in a sleeve section 27, with a universal joint 28 connecting the sleeve 27 to the power take off shaft 14 and a universal joint 29 connecting the square shaft 26 to a stub shaft 30 projecting forwardly from a gear housing 31 through a removable cover plate 32, the stub shaft 30 being fixed to a spur gear 33 (Fig. 10) which is rotatably mounted in the gear housing 31. A second gear 34 meshing with the gear 33 has a stub shaft 35 projecting forwardly through cover plate 32 for selective connection with the adjacent portion of the universal joint 29. It will be understood that both gear 33 and gear 34 are rotatably mounted on suitable bearings in the gear housing 31 and the cover plate 32 in any well-known manner. The gear housing 31 is supported by struts 36, 36' which are suitably fixed to the members 21, 21' by welding or the like and secured by means of bolts or the like to the gear casing 31. The stub shafts 30 and 35 project rearwardly from the gear casing 31, the stub shaft 30 being shown in splined connection with a stub shaft 37 (Fig. 9) which carries a beveled gear 38 on its inner end which meshes with a beveled gear 39 fixed to a shaft 40 suitably supported in bearings 40', the gears being encased in a gear box 41 and the shaft 40 being located within a tubular housing 42.

The lower end of the tubular housing 42 is provided with an internally threaded coupling 43 which screws on to an externally threaded boss 44, fixed to the cutter bar 25, whereby the gear box 41 and the tubular housing 42 are secured to the cutter bar 25.

The cutter bar 25 includes an open bottom housing having a top 45 and wedge-shaped ends 46, 46' and wedge-shaped front and rear edges 47, 47', the bottom of the cutter housing being closed by a removable plate 48 suitably secured to an inwardly extending peripheral flange 49 by means of machine screws 50 threaded into tapped holes in the flange 49.

Secured to the top plate 45 are a plurality of bosses 51, 51 in which removable bearings or bushings 52 are mounted by any suitable means, such as set screws or being pressed in position, and similar bosses 53, 53 are provided on the bottom plate 48 in which suitable bearings or bushings 54A are removably mounted, each set of associated bearings 52 and 54A serving to rotatably mount power driving shaft 55 at the center and shafts 55A at the left end and 55B at the right end, or intermediate shafts 56. The upper ends of shafts 55, 55A and 55B project through the top 45 and are provided with squared ends 57, 57A, 57B, which are adapted to be received in a square socket in the lower end of the shaft 40 to provide for direct driving relation of one of the shafts 55, 55A or 55B from the shaft 40 which, in turn, is driven through previously described means from the power take-off shaft 14 of the tractor.

Any of the shafts 55, 55A or 55B may drive all the other shafts 55, 55A, 55B and driven shafts 56 in the cutter bar 25, each of the shafts being provided with at least one sprocket and all of the shafts, except the end shafts 55A and 55B being provided with two sprockets 58, 58' which cooperate with appropriate chains 59 or 59' respectively, whereby all of the shafts in the cutter bar are rotated under power. It will be apparent that the bearings supporting the several shafts 55 and 56 are preferably thrust bearings of the antifriction type to transfer any end thrust of the shafts to the cutter bar.

The lower ends of the several shafts 55, 55A, 55B and 56 project through the bottom plate 48 and on each of the shafts an upper hat-shaped member 60 is mounted.

Lower hat-shaped members 61 are provided on each of the intermediate shafts 55 and 56, the lower hat-shaped members being of substantial depth so that the brim portion thereof is approximately 2" from the brim portion of the upper hat-shaped member 60 while lower hat-shaped members 61A and 61B on the end shafts 55A and 55B have their brim portions spaced approximately one inch from the brim portions of the associated hat members 61, 61. Each of the hat-shaped portions serves as a mounting for blades 62 secured to the brim portions of the hat-shaped members by means of bolts 62' or the like which bolts may be provided with nuts or may be threaded into tapped apertures in the cutting blades 62, the cutting edges of the blades being sharpened by bevelling the upper edges of each side edge of the triangular blades for cutting the vegetation and plants and/or the earth with which they come in contact. The blades 62 being sharpened on both side edges permits the driving of the cutters in either direction of rotation for obtaining the cutting action. It will be observed that all of the cutters rotate in the same direction so the blades on the lower hat-shaped member of one cutter are beneath the blades of the upper hat-shaped member of adjacent cutters thereby providing sufficient clearance and also providing overlapping of the effective cutting action of the blades in the operation so that a swath the full length of the cutter bar can be made in all types of vegetation including very coarse and dense material. When no vegetation is on the ground the lower blades 62 may dig into the earth a reasonable amount being limited by the upper blades 62 on the upper hat-shaped members 60 which prevent excessive penetration or cutting into the ground. The trailing side edge of the cutter blades receives a honing or sharpening action while the leading edge is performing the cutting whereby the blades are self sharpening.

The cutters including hat-shaped members 60 and 61 are retained on the ends of the shaft 55 or 56 between a shoulder 63A on the shaft and a nut 63 threaded on lower threaded ends of corresponding shafts with a key or the like 64 preventing relative rotation between the shaft and the hat-shaped members thereon.

Although the cutter bar engaging the ground will maintain the cutting blades 62 at a level for cutting beneath the surface of the ground it is sometimes desirable to have the cutters above the ground for cutting growing vegetation only. One means for maintaining this spaced relation of the cutter blades 62 above the ground is by means of a series of rollers 65 which may be in the form of a continuous roller or a plurality of smaller rollers mounted on a shaft 66 having its ends mounted on the stem ends of inverted J-shaped levers 67A, 67B, the hook ends of which are pivotally mounted on the lugs 68A, 68B respectively, on cutter bar 25, the J-shaped levers 67A and 67B are maintained in adjusted relation by apertured links 69A, 69B pivotally mounted on the rear edge of the cutter bar 25 so that a fastening element such as a bolt or pin 70 may pass through the J-shaped lever and one of the apertures in the links 69A or 69B whereby any selective adjustment can be obtained and, if desired, there may be a difference in the depth of cut at one end of the cutter bar over the depth of cut at the other end.

As previously described, the leading edge of the cutter bar 25 is secured to sleeve 22 of the towing frame (Figs. 5 and 6) and such towing frame may be raised or lowered by the controlled movements of lifting levers 17 and 17' which serve to raise or lower the apertured bar 16. Suitable lengths of chain 71, 71' are connected between the bar 16 and the members 21 and 21' respectively of the towing frame. By this means the towing frame may be raised and lowered along with the cutting bar 25 and the cutters thereon so that the roller 65 is completely off the ground whereby the cutter can be moved from one field to another without cutting the vegetation or this same means may be used to maintain the cutters at a selected level which would be dependent upon the engagement of the tractor wheels with the ground. Diagonal chains 72, 72' extend between the tubular frame members 21, 21' respectively to suitable hooks or the like 74' on the axle housing sections 13 and 13' respectively whereby the towing bar may be maintained in a definite relation with respect to the direction of travel of the tractor. In some installations the chain 72 and 72' may be kept slack so that the cutter bar 25 trails in a conventional manner, the chains preventing excessive movement. Additional guide chains 73, 73' may be provided from suitable hooks on the axle housing enlargement to the lever arms 15 and 15' respectively.

Referring to Fig. 7, a cutter bar 25 which is similar to that shown in Figs. 1 and 8, is disposed at an angle to the direction of movement of the tractor 10 with the outer end 46' located substantially in line with a vertical projection of the axis of the rear driving wheels 12, 12' of the tractor. The cutter bar 25 (Fig. 7) is provided with two additional pairs of mounting lugs 24A, 24A', and 24B, 24B', the mounting lugs 24A and 24A' being arranged in alignment with the towing frame sleeve 22 disposed therebetween with the shaft 23 passing through the lugs and the sleeve for maintaining the parts in connected relation with the towing frame. The angular position of the cutter bar and towing frame is maintained by means of chain 72' which has been shortened while chain 72 has been lengthened sufficiently to permit such arrangement, the shortened chain 72' being normally under tension as the cutter bar is towed by the tractor. The other parts shown in Fig. 3 are similar to those shown in Figs. 5 and 6 with some slight differences in the adjustment of the chain for maintaining the correct relationship.

The drive between the power take-off shaft 14 and the cutters is accomplished through universal joints, telescopic shaft, gear housing, and the gear box in the manner previously described except that shaft 40 extending downwardly from the gear box 41 has the lower socket thereof receiving the square end 57A of shaft 55A. Although, normally the unused shaft ends 57, 57A, 57B and bosses 44, 44A, and 44B are protected by covers 75, such covers are omitted in all the figures except Fig. 9 so that the parts may be readily identified.

In Fig. 8, two cutter bars, 25A and 25B are arranged in echelon arrangement with the end 46' of cutter bar 25A adjacent the end 46 of cutter bar 25B suitable lugs 76A, 76A' and 76B and 76B' being provided on the adjacent ends of cutter bars 25B and 25A respectively, with a pivot shaft 77 extending through the lugs 76A, 76A', 76B, 76B' whereby the cutter bar 25A may hinge relative to the cutter bar 25B so that the cutters may operate on irregular terrain.

For towing the cutting bars 25A and 25B, an L-shaped plate 78 is supported from the enlargement 13A of the rear axle by means of a pivot pin or the like in a yoke 20 previously described a first yoke 79A being provided at one end of plate 78 and a second yoke 79B at the other end; the yoke 79B receiving the plate 19 of the towing frame for the cutter bar 25B, such towing frame including the plate 19, members 21, 21' and the sleeve member 22, a shaft 23 passing through the lugs 24A, 24A' and the sleeve 22 and being retained in position by means of cotter pins. It will be noted that a gear box 41 is mounted directly over the shaft 55A of cutter bar 25B with the shaft 40 extending downwardly from the gear box 41 and having the rectangular socket in the lower end thereof receiving the square end 57A of the shaft 55A whereby driving relation is obtained to the cutters and the cutter bar 25B in the manner similar to that shown in Fig. 9.

The cutter bar 25A is connected to the plate 78 by a towing frame which is similar to the towing frame shown in Figs. 5 and 6 with the side members 21A and 21A' shown as being of greater length, the plate 19A connecting the forward ends of the side members 21A and 21A' being mounted in the yoke 79A and retained in position by a bolt passing through the yoke and through the plate and the rear end of the towing frame being provided with a sleeve 22A which is in alignment with lugs 24B and 24B' through which lugs and sleeve a shaft 23 is passed being retained in position by means of cotter pins through each end thereof. The drive for the cutter 25A is accomplished through a gear box 41 which has a downwardly extending shaft 40 which has the socket therein receiving the square end 57B of the shaft 55B whereby the cutters of the cutter bar 25A are power driven. The power to the gear box 41 is obtained through shaft 37, shaft 30, universal joint 29, telescoping shafts 26A and 27A, universal joint 28, a stub shaft 80 rotatably mounted in a gear box 81 which is fixably mounted to the axle housing the tractor in any suitable manner (not shown). The shaft 80 projects forwardly of the gear box 81 and is coupled to power take off shaft 14 of the tractor.

The cutters in cutter bar 25B are similarly driven from shaft 40 from the gear box 41 through cutter shaft 55A power being obtained in gear box 41 through shaft 37, shaft 30, universal joint 29, telescoping shafts 26B, 27B, universal joint 28 and a stub shaft 82 of the gear box 81, the stub shafts 80 and 82 carrying gear 83 and 84 respectively which are in mesh with one another whereby both stub shafts 80 and 82 rotate in opposite directions. It will be noted that the cutters on the cutter bars 25A and 25B will rotate in opposite directions so that any tendency of the cutter bars to move transversely of the path of movement of the vehicle is compensated for by a similar action in the other cutter bar with the result that there should be no appreciable tendency for the cutter bar assembly to pivot relative to the tractor during the cutting operations. The direction of rotation of the cutters can be changed by connecting telescoping shafts 26, 27 to shaft 35 instead of shaft 30. This may also control the speed by the relative sizes of gears 33 and 34.

For maintaining the towing frames in proper position, chains are provided similar to the chains previously described, a chain 72A extending from the frame member 21A to the hook 74 a chain 72B extending from the hook 74' to the frame member 21, a chain 72A' extending from the hook 74' to the frame member 21', a chain 72B' extending from the hook 74' to the frame member 21A'. Chains 71A, 71B and lifting chains 71A' and 71B' extend from the towing frame members 21A, 21A' and 21, 21' respectively to the apertured bar 16 whereby the lifting levers 17 and 17' acting through links 18 and 18' to the lever arms 15 and 15' may serve to raise the towing frames and thereby the cutter bars in a manner similar to that previously described. The chains 73, and 73' serve to maintain the other arms 15 and 15' in proper relation against lateral swaying.

A suitable means may be provided to connect the cutter bars 25A and 25B so that upon lifting the towing frames the entire cutter bars 25A and 25B will be raised and this may be accomplished by a provision of a connecting element to maintain the cutting bars in fixed relation. A tension member may extend from the outer ends of the cutter bars 25A and 25B over upwardly extending struts located adjacent the hinged connection 77 between such cutter bars in a manner similar to an inverted V. Such tension member (not shown) would prevent objectionable dropping off of the free ends of the cutter bars.

From the above description it is believed to be obvious that cutter bars 25A or 25B may be interchangeable with the cutter bar 25' shown in Figs. 1, 2, 3 and the extra lugs 24A, 24A' and 24B, 24B' do not in any way interfere with the operation in the manner shown in Figs. 1, 2 and 3 and the lugs 76A', 76A and 76B and 76B' may be arranged to lie within the ends of the cutter bar so as to avoid sharp projections beyond the wedge shaped ends of the cutter bar housing and therefore a single cutter bar may be manufactured and used in all of the positions shown and with a slight modification in the towing frame made up of members 21A and 21A', the parts are substantially duplicates and universally interchangeable making the cutter and/or cultivator of the present invention particularly useful due to the low cost of manufacture, and the possibility of innumerable uses with existing tractor equipment.

In the modification shown in Fig. 7, the outer end of the cutter bar 25 being in line with the axis of the driving wheels of the tractor gives the operator complete control so that he may accurately encircle a tree or the like during the cutting or cultivating operation.

A handle 85 extends rearwardly from the gear box 41 whereby the cutter bar may be raised as a unit by manual force, if desired, the handle 85 being at a location which requires a minimum of stooping by the person doing the lifting.

In the modification shown in Fig. 7 where the lifting chain 71 is shown, such lifting chain may be reinforced with a strut, such as a channel member extending between the apertured bar 16 and the towing frame member 21 whereby the outer end of the cutter bar may be lifted by the conventional lifting levers 17, 17' through the lifting chain 71'. When the cutter bar is raised by this means the cutter bar may be moved from one field to another without engaging the ground.

It will be apparent that combination of the above equipment may be used in varying manner and that the cutter bars shown in Figs. 1 to 4 may be mounted on either side of the tractor or may be mounted on both sides of the tractor while a cutter in the form shown in Figs. 5 and 6 or 8 may be mounted in a trailing position and all of such cutters may be driven under the control of the operator of the tractor. The cutters mounted on the side may be projected and withdrawn as conditions require and the drive may be positive mechanical or may be hydraulic drive, and the cutters may operate in either forward or reverse direction.

What is claimed is:

1. A mower comprising a mobile frame, driving means on said frame, a laterally extending cutter bar located adjacent said frame, an adjustable and extensible mounting frame interconnecting said mobile frame and said cutter bar, power transmitting means on said cutter bar, and independent extensible elbow drive means interconnecting said power transmitting means and said driving means.

2. The structure of claim 1 in which said elbow drive means includes elongated driving members pviotally connected in a manner that power will be transmitted through such pivotal connection.

3. The structure of claim 1 in which said elbow drive means includes pivotally connected driving members relatively movable to vary the length of the drive.

4. The structure of claim 1 in which elbow drive means includes a pair of pivotally connected drive members and with means for effecting a drive through the pivotal connection thereby to vary the distance between the driving and driven extremities of said pivoted members.

5. The structure of claim 1 in which the cutter bar is constructed for reception of a driving connection at spaced locations along the length of the same.

6. The structure of claim 1 in which the cutter bar is constructed for attachment at various locations and at various angles beside and behind said frame.

7. The invention according to claim 1 in which the cutter bar is mounted for angular horizontal adjustment with respect to said frame.

8. The invention according to claim 1 in which said cutter bar is provided with a recessed mounting flange to provide for adjusting the angularity of said cutter bar with respect to said frame.

9. The invention according to claim 1 in which said cutter bar is provided with cutter means rotatably mounted on vertical axes.

10. The invention according to claim 1 wherein said cutter bar has rotary cutters including blades disposed in different planes and in overlapping relation.

11. A device of the character described comprising a mobile frame, driving means on said frame, driven cutter bar means on said frame movable relative to said driving means, and independent elbow drive means interconnecting said driving and driven means, said elbow drive means including a pair of pivotally connected drive members and with means for effecting a drive through the pivotal connection, said pivotally connected drive members being relatively movable to permit said cutter bar means to move relative to said frame without interrupting the drive to said cutter bar means.

References Cited in the file of this patent

UNITED STATES PATENTS

| | | |
|---|---|---|
| 1,397,365 | Cook | Nov. 15, 1921 |
| 1,911,516 | Landing | May 30, 1933 |
| 1,953,394 | Clapper | Apr. 3, 1934 |
| 2,165,851 | Harman | July 11, 1939 |
| 2,528,116 | Clemson | Oct. 31, 1951 |
| 2,777,272 | Smith | Jan. 15, 1957 |
| 2,815,048 | Davis | Dec. 3, 1957 |